(12) United States Patent
Frost et al.

(10) Patent No.: US 11,386,056 B2
(45) Date of Patent: Jul. 12, 2022

(54) DUPLICATE MULTIMEDIA ENTITY IDENTIFICATION AND PROCESSING

(71) Applicant: International Business Machines Corporation, Armonk, NY (US)

(72) Inventors: Keith G. Frost, Delaware, OH (US); Stephen A. Boxwell, Columbus, OH (US); Kyle M. Brake, Dublin, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 16/415,042

(22) Filed: May 17, 2019

(65) Prior Publication Data
US 2020/0364196 A1 Nov. 19, 2020

(51) Int. Cl.
*G06F 16/00* (2019.01)
*G06F 16/215* (2019.01)
*G06F 16/25* (2019.01)
*G06F 16/2455* (2019.01)
*G06F 16/483* (2019.01)

(52) U.S. Cl.
CPC ...... *G06F 16/215* (2019.01); *G06F 16/24568* (2019.01); *G06F 16/258* (2019.01); *G06F 16/483* (2019.01)

(58) Field of Classification Search
CPC .......... G06F 16/215; G06F 16/258; G06F 16/24568; G06F 16/483; G06F 16/1748
USPC .................................................. 707/600–899
See application file for complete search history.

(56) References Cited

U.S. PATENT DOCUMENTS

| 8,798,402 | B2 | 8/2014 | Hill et al. |
| 9,311,395 | B2 | 4/2016 | Kocks et al. |
| 2003/0101144 | A1 | 5/2003 | Moreno |
| 2008/0288255 | A1 | 11/2008 | Carin |
| 2010/0131279 | A1* | 5/2010 | Pilz ..................... H04L 63/0861 726/28 |
| 2012/0189212 | A1* | 7/2012 | Ren ....................... G06F 16/783 382/218 |

(Continued)

FOREIGN PATENT DOCUMENTS

WO 2011045424 4/2011

OTHER PUBLICATIONS

List of IBM Patents or Applications Treated as Related, May 2019.

(Continued)

*Primary Examiner* — Irete F Ehichioya
*Assistant Examiner* — Shirley D Hicks
(74) *Attorney, Agent, or Firm* — Lieberman & Brandsdorfer, LLC

(57) ABSTRACT

Embodiments relate to a computer platform and corresponding process and program code to assess multimedia files with respect to similarity and duplicate media content. Data streams are converted into sequences of events, and object representation within the streams is identified and subject to processing with respect to the event sequences. A similarity assessment is conducted between two or more of the data streams, and a corresponding distance measurement to quantify similarity is produced. Duplicate data is selectively identified in response to the similarity assessment and the produced distance measurement.

15 Claims, 8 Drawing Sheets

(56) References Cited

U.S. PATENT DOCUMENTS

| | | |
|---|---|---|
| 2012/0233177 A1 | 9/2012 | Teerlink |
| 2015/0127347 A1* | 5/2015 | Tjalve .................. G10L 15/187 704/257 |
| 2015/0143063 A1* | 5/2015 | Mutalik .................. H04L 67/10 711/162 |
| 2015/0161214 A1* | 6/2015 | Kali .................. G06F 16/24558 707/758 |
| 2017/0046343 A1 | 2/2017 | Raichelgauz et al. |
| 2018/0254070 A1 | 9/2018 | Song et al. |
| 2019/0273767 A1 | 9/2019 | Nelson |

OTHER PUBLICATIONS

Office Action for U.S. Appl. No. 16/415,041, filed Jun. 2, 2021.
U.S. Appl. No. 16/415,041, Office Action, dated Feb. 24, 2022.

* cited by examiner

US 11,386,056 B2

DUPLICATE MULTIMEDIA ENTITY IDENTIFICATION AND PROCESSING

BACKGROUND

The present embodiments relate to identifying similarity of multimedia entities. More specifically, the embodiments relate to applying a distance assessment for identifying duplicate data, and correlating the distance assessment to a similarity protocol.

In the field of artificially intelligent computer systems, natural language systems (such as the IBM Watson® artificially intelligent computer system and other natural language interrogatory answering systems) process natural language based on knowledge acquired by the system. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use minimum data, visual recognition, and natural language processing to solve problems and optimize human processes.

At the core of AI and associated reasoning lies the concept of similarity. The process of understanding natural language and objects requires reasoning from a relational perspective that can be challenging. Existing solutions for identifying similarity between files generate representative hash codes based on pixel or audio samples. However, these existing solutions can be circumvented by shifting color, speed, or tone, or by wrapping video content in a frame.

SUMMARY

The embodiments include a system, computer program product, and method for evaluating multimedia data streams and identifying similarity of data across two or more data streams and corresponding files.

In one aspect, a system is provided for use with a computer platform to process multimedia data and subject the processed data to a similarity assessment. A processing unit is operatively coupled to memory and is in communication with a knowledge engine configured to assess similarity. The knowledge engine is provided with tools to support the similarity assessment, including at least a data manager and an assessment manager. The data manager, which is in communication with the processing unit, is activated by the knowledge engine and employed to process one or more data streams. The stream processing includes converting the data streams into event sequences, and detecting a corresponding object representation in the respective data streams. The assessment manager functions to conduct a similarity assessment between the at least two data streams. The assessment includes comparing the sequences of events, and producing a distance measurement from the comparison. The distance measurement quantifies similarity between the event sequences. Duplicate data is selectively identified in the sequences of events in response to the similarity assessment and produced distance measurement.

In another aspect, a computer program device is provided for use with an intelligent computer platform to process and evaluate multimedia data with respect to similarity. The device has program code embodied therewith. The program code is executable by a processing unit to detect and process multimedia data and assess similarity. Program code processes one or more data streams, with the processing including converting the data streams into event sequences, and detecting a corresponding object representation in the respective data streams. Program code conducts a similarity assessment between the at least two data streams, with the similarity assessment including a comparison of the sequences of events. A distance measurement is produced from the comparison. The distance measurement quantifies similarity between the event sequences. Duplicate data is selectively identified in the sequences of events in response to the similarity assessment and produced distance measurement.

In yet another aspect, a computer implemented method is provided to process multimedia data and subject the processed data to a similarity assessment. One or more data streams are subject to processing, which includes converting the data streams into event sequences, and detecting a corresponding object representation in the respective data streams. A similarity assessment is conducted between the at least two data streams. The assessment includes comparing the sequences of events, and producing a distance measurement from the comparison. The distance measurement quantifies similarity between the event sequences. Duplicate data is selectively identified in the sequences of events in response to the similarity assessment and produced distance measurement.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Multimedia is the integration of multiple forms of media, including text, graphics, audio, video, etc. Evaluation of multimedia content pertains to the individual components that form the media, such as visual recognition of objects, recognition of text or speech, or a combination of visual recognition and speech-to-text (STT) to capture content. With respect to multimedia data, similarity may be exact or non-exact. Regardless of the scope of similarity, it is understood that it be measurable, e.g. quantifiable.

It is understood in the art that a source, such as a library or corpus, contains documents with data therein. Data that populates the source, e.g. source data, may come from different venues, and may not have been subject to processing to capture content. The captured content may be factually accurate, or in one embodiment, slightly inaccurate. As shown and described herein, tools and a corresponding method and computer program product are provided to measure similarity on different or combined aspects of multimedia data to quantify a degree of similarity, and to apply the quantified similarity to identify inappropriate copying, e.g. copyright infringement, of the multimedia data.

Figure 1:
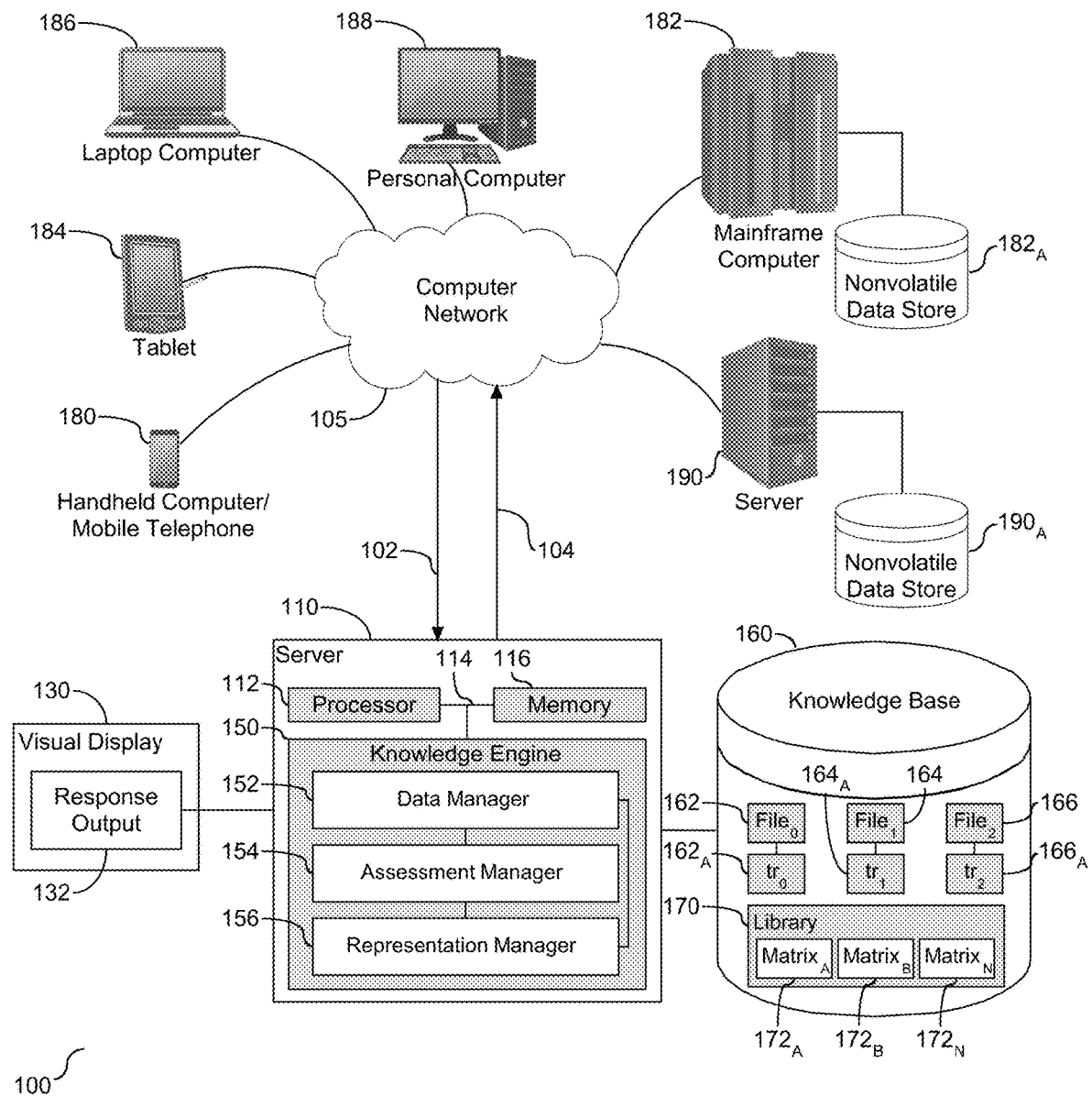
FIG. 1 depicts a system diagram illustrating a system connected in a network environment that supports data similarity assessment and identification.

Referring to FIG. 1, a schematic diagram of a computer system (100) to support data similarity assessment and identification is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with a knowledge engine (150) to evaluate and selectively identify duplicate data over the network (105) from one or more of the computing devices (180), (182), (184), (186), (188), and (190). As shown, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable data conversion, recognition, and resolution. Other embodiments of the server (110) may be used with components, systems, sub-systems, and/or devices other than those that are depicted herein.

The knowledge engine (150) is shown herein configured to receive input (102) from various sources. For example, knowledge engine (150) may receive input from the network (105) and leverage a data source (160), also referred to herein as a corpus or knowledge base, to identify duplication media content. As shown, the data source (160) is configured with documents or files, with a representation shown herein as $file_0$ (162), $file_1$ (164), and $file_2$ (166). Although three files are shown, the quantity should not be considered limiting. In one embodiment, the data source (160) may include additional documents or files, or in another embodiment, a reduced quantity of documents or files. Each document or file in the data source may be organized by common subjects or themes, although this is not a requirement. In one embodiment, the documents or files may be logically grouped based on common characteristics, sources, data, etc. Data that is populated into the knowledge base may be from similar or dissimilar sources. There is no restriction on the origination of the data that is populated into the knowledge base (160).

As shown and described herein, two sets of data, such as data streams, data components, or aspects of data are assessed with respect to similarity. The assessment creates models of the data content, and compares the models to identify close matches. The data modeling may be directed at different forms of data, including audio, text, and image. For descriptive and inclusive purposes, the description herein will be directed to multimedia data that may include one or more of the different forms of the data, including combinations of the different forms.

The various computing devices (180), (182), (184), (186), (188), and (190) in communication with the network (105) may include access points for the logically grouped documents or files of the data source (160). The knowledge engine (150) functions as a platform to process the data, conduct a similarity assessment on one or more aspects of the processed data, and selectively identify duplicate data from the similarity assessment. Identified duplicate data may be presented as response output data (132). In one embodiment, the knowledge engine (150) communicates the response output data (132) to a visual display (130), shown herein operatively coupled to the server (110) or one or more of the computing devices (180)-(190) across network connection (104).

The network (105) may include local network connections and remote connections in various embodiments, such that the knowledge engine (150) may operate in environments of any size, including local and global, e.g. the Internet. The knowledge engine (150) serves as a front-end system that can make available a variety of knowledge extracted from or represented in documents, network accessible sources and/or structured data sources. In this manner, some processes populate the knowledge engine (150), with the knowledge engine (150) also including input interfaces to receive requests and respond accordingly.

As shown, content subject to processing may be received by the knowledge engine (150) from one or more operatively coupled devices via the network (105). In one embodiment, content subject to processing may be local to the knowledge base (160), and may include any structured and unstructured documents, including but not limited to any file, text, article, or source of data (e.g. scholarly articles, dictionary, definitions, encyclopedia references, and the like) for use by the knowledge engine (150). Content users may access the knowledge engine (150) via a network connection or an internet connection to the network (105), and may submit input to the knowledge engine (150) that may effectively determine an output response (132) in the form of identified duplication data.

The knowledge engine (150) is shown herein with several tools to support content processing and similarity assessment, including a data manager (152), an assessment manager (154), and a representation manager (156). The data manager (152) functions to conduct an initial processing of data or data stream. It is understood that data is documented sequentially. For example, data may be created sequentially with respect to time, with the data subject to ordering or placement based on time. A data stream is a sequence of digitally encoded coherent signals used in a transmission, and comprises data in one or more of the following formats: audio, text, images, and video. The similarity assessment shown and described herein is directed to visual recognition and audio recognition to identify the presence or absence of duplicate media content.

The data manager (152) functions as a tool, either a software tool or a hardware tool, to process one or more data streams, or in one embodiment, one or more files, e.g. multimedia files. In one embodiment, the data manager (152) is dynamically activated in response to detection or receipt of data or a data file. A data stream is a sequence of events ordered by time. The processing conducted by the data manager (152) maintains the time order and converts each data stream that is the subject of the assessment into a corresponding sequence of events. For example, in one embodiment, $file_0$ (162) represents a first data stream, $file_1$ (164) represents a second data stream, and $file_2$ (166) represents a third data stream. In one embodiment, the data streams are received across the network (105), processed by the data manager (152), with the processed data streams represented and stored in the knowledge base as files, e.g. (162)-(166). While maintaining the sequence of events as represented in the files, the data manager (152) identifies one or more formats of representations in the files, including audio representation(s) and object representation(s). It is understood that different forms of representations have different formats. More specifically, with respect to identified audio within a subject data stream, the data manager (152) identifies the audio and processes the corresponding representation into a text representation, also known herein as speech-to-text (STT) conversion. Similarly, with respect to the identified video within the subject data stream, the data manager (152) identifies the video and processes images within the video for object recognition. Accordingly, the data manager (152) is configured to perform both STT on the audio track and object recognition on the visual component of the data stream to identify audio and objects present within each data stream, while maintaining the sequence of the corresponding data stream.

The files that are the subject of processing by the data manager (152) represent a sequence of events, with each event having a corresponding time frame, e.g. time stamp. The time characteristics facilitate maintaining an order of the identified objects and text within each of the files subject to processing. As shown, the assessment manager (154) is operatively coupled to the data manager (152) and the knowledge base (160). The assessment manager (154) functions to conduct a similarity assessment between two or more data streams. The similarity assessment is directed at identification of close matching data, and in one embodiment may be a non-exact matching of the data. As shown and described in detail in FIGS. 3-5, the assessment manager (154) conducts a comparison of the two or more data streams, with the comparison producing a distance measurement that quantifies similarity between the two or more data streams, and more specifically quantifies similarity between a corresponding sequence of events as represented in the two or more data streams. In producing the distance measurement, the assessment manager (154) identifies a quantity of edits that are required to create an equivalency between two events. Accordingly, the distance measurement characterizes a value corresponding to the separation between two events.

With respect to text representation and assessment thereof, the assessment manager (154) leverages a phonetic confusion matrix. As shown herein, the knowledge base (160) includes a library (170) with a plurality of phonetic matrices stored therein, including $matrix_A$ ($172_A$), $matrix_B$ ($172_B$), and $matrix_N$ ($172_N$). Although only three matrices are shown, the quantity should not be considered limiting. In one embodiment, the matrices are categorized by topic or region. Through use of one or more of the matrices, the assessment manager (154) leverages a corresponding matrix to identify confusable phrases with respect to the identified phrases of the data stream, and conducts a phrase replacement to replace the identified confusable phrase with an equivalent phrase from the matrix. The phrase replacement enables the assessment manager (154) to identify easily confusable phrases and assume they are the same or equivalent to account for error translation. In one embodiment, the distance measurement value is the same for original phrases and identified confusable phrases. Accordingly, leveraging the matrix enables the assessment manager (154) to effectively enlarge the scope of the distance measurement through identification of one or more equivalent phrases.

As shown, a representation manager (156) is provided in the knowledge engine (150), and is configured to create tuple representations and sequentially order the representations. In one embodiment, each tuple representation includes a combination of one or more object entities, and dialogue words for each time stamp. An example tuple representation includes <$object_0$, $object_1$, dialogue $word_0$, timestamp>. Although two objects and a single dialogue word are shown in this example, the quantity should not be considered limiting. Individual tuple representations may include a single word and a single object, multiple words per object, or multiple objects per word. It is understood that the distance measurement conducted by the assessment manager (154) may be set for a defined time interval with a defined start time and end time having a corresponding time stamp, e.g. $time\_stamp_0$. The representation manager (156) places the tuple representations in a sequential order based on the time stamp metadata characterized in each tuple. The tuple representations and sequential ordering is created by the representation manager (156) for each data stream, e.g. file. The representation manager (156) saves the tuple representation(s) and creates an association between the tuple representation(s) and the corresponding file. In the example shown herein, the tuple representation(s) are stored in the knowledge base (160). As shown, $file_0$ (162) has corresponding tuple representation, $tr_0$ ($162_A$), $file_1$ (164) has corresponding tuple representation, $tr_1$ ($164_A$), and $file_2$ (166) has corresponding tuple representation, $tr_2$ ($166_A$). Accordingly, the representation manager (156) creates a tuple representation for one or more files, with each set of tuple representations identifying a sequential correspondence between objects and words in a data stream.

The assessment manager (154) leverages the tuple representation(s) to identify the proximity of two files or data streams. In one embodiment, the assessment identifies the quantity of edits to make sentences between two files the same. For example, in one embodiment the assessment manager (154) compares a subset of tuples and the text and/or objects represented therein. The speech-to-text translation of the audio and the optical recognition of objects need not be accurate or precise. Rather the translation of the audio and recognition of the objects should be consistent or relatively consistent. In one embodiment, the relative consistency reflects the same or similar errors in different files, thereby ensuring that the comparison is compatible across two or more files. The distance calculation reflects the proximity of two data streams, or in one embodiment proximity of a subset of the data streams. The proximity corresponds to an edit distance, which in one embodiment is a configurable factor. Comparisons of data streams that fall within the edit distance are identified or tagged as likely duplicate data streams. Accordingly, the duplicate data is identified as data streams or subsets of data streams that are identified within the edit distance as reflected in the distance calculation and corresponding distance measurement.

The similarity assessment may be performed prior to receipt of a submission, or in one embodiment, may be conducted dynamically with respect to submission of a data stream document, or file. The dynamic assessment leverages the assessment manager (154) to dynamically compare submitted or received data to a previously processed data stream, document, or file stored in the knowledge base (160). The data manager (152) processes the received data stream, and creates a set of corresponding tuple representations for the received data stream. It is understood in the art that in one embodiment, all received data streams are subject to similarity assessment. In one embodiment, the data stream subject to similarity assessment is selectively received, with the selection based on the similarity assessment and the produced distance measurement. Accordingly, the data manager (152) is configured with the ability to evaluate and assess data stream and document similarity for selective receipt.

The assessment manager (154) may present the received data stream to a single source and evaluate similarity assessment with respect to the source. However, the assessment manager (154) is not limited to a single source, and in one embodiment, the assessment manager (154) may present the received data stream to multiple sources or libraries, such as a first source and a second source. In this example, the assessment manager (154) conducts the same functionality as with a single source, but instead of applying a single similarity assessment score, the assessment manager (154) applies a first reliability score to data from the first source and applies a second reliability score to data from the second source, and conducts a sorting or organization of the response data based on their respective reliability scores.

The assessment manager functions as a software or hardware tool to produce a similarity measurement that quantifies similarity between two data streams or segments of data streams. In one embodiment, the quantified similarity directly corresponds to duplicate speech, text, and objects. It is understood that the data subject to evaluation may be received in different formats. As shown, the data manager (152) is provided operatively coupled to the assessment manager (154) and the representation manager (156). The data manager (152) functions as a tool to facilitate processing of data, including a data stream with voice, text, and objects. For example, in one embodiment, the data manager (152) detects audio within the data stream, and conducts a speech-to-text (STT) translation of the audio to effectively translate or convert the audio to text. In one embodiment, the data manager (152) conducts natural language processing (NLP) of the STT translation, such as, but not limited to, detecting grammatical components within the received natural language (NL) context, etc. The detected and processed STT from the data stream is forwarded from the data manager (152) to the assessment manager (154) for similarity processing and assessment.

The data manager (152) is configured to detect and observe electronic communications, such as electronic data streams. In one embodiment, the communication is ongoing, and the data manager (152) functions in real-time to detect and observe the communication. For example, in one embodiment, the data manager (152) observes communication channels to ascertain if there is an on-going communication, e.g. live text based communication. In one embodiment, the data manager (152) functions as a background tool for the electronic communication detection and observation. As shown, the data manager (152) is operatively coupled to the assessment manager (154) and the representation manager (156) to evaluate electronic data across communication channels. With respect to NLP, the data manager (152) utilizes NLP protocols to interpret an expression and an associated intent with the electronic data subject to evaluation. In one embodiment, the data manager (152) identifies grammatical components, such as nouns, verbs, adjectives, punctuation, punctuation marks, etc. in the electronic data. Similarly, in one embodiment, one or more reasoning algorithms may look at temporal or spatial features in language of the electronic data. In one embodiment, the data manager (152) converts the electronic communication to well-formed content, e.g. natural language text, so that the content may be interpreted and evaluated by the assessment manager (154), to formulate and present the response output (132). Accordingly, the data manager (152) functions to dynamically support and process speech and text within an electronic medium.

In some illustrative embodiments, server (110) may be the IBM Watson® system available from International Business Machines Corporation of Armonk, N.Y., which is augmented with the mechanisms of the illustrative embodiments described hereafter. The IBM Watson® system may receive an electronic communication, such as a data stream, as input content (102) which it then analyzes to identify characteristics of the content (102) that in turn is subject to representation conversion and similarity assessment. Based on application of the content (102) for similarity assessment, duplicate data is selectively identified. In one embodiment, a set of candidate duplicate data outcomes are generated by looking across the corpus of data (160) for portions of the corpus of data (160) that have some potential for containing matching data within a quantified distance measurement of the identified characteristic(s) of the content (102).

The response output (132) is directed at specific content. In one embodiment, the response output (132) may be in the form of a link to a source identifying the duplicate or alleged duplicate data. Similarly, in one embodiment, the response output (132) may include both content and the source link. Accordingly, the content of the response may come in different forms, or a combination of forms.

The data manager (152), assessment manager (154), and representation manager (156), hereinafter referred to collectively as tools or knowledge engine tools, are shown as being embodied in or integrated within the knowledge engine (150) of the server (110). The tools may be implemented in a separate computing system (e.g., 190) that is connected across network (105) to the server (110). Wherever embodied, the tools function to evaluate electronic data, such as an electronic data stream, electronic data content, electronic data communication(s), etc. assess similarity or substantial similarity between two electronic data elements, and selectively identify and process data determined to be similar or substantially similar so that a corresponding and accurate response and response content may be communicated as response output (132), which in one embodiment is presented on a visual display (130).

As shown and described above, the representation manager (156) leverages the processing conducted by the data manager (152) to organize and create representations of the processed data together with corresponding metadata, e.g. timestamp data. In one embodiment, the representation manager (156) creates a sequential order of the created representations based on the corresponding metadata.

Types of information handling systems that can utilize the knowledge engine (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store (182A). The nonvolatile data store (182A) can be a component that is external to the various information handling systems or can be internal to one of the information handling systems.

The information handling system employed to support the knowledge engine (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 2:
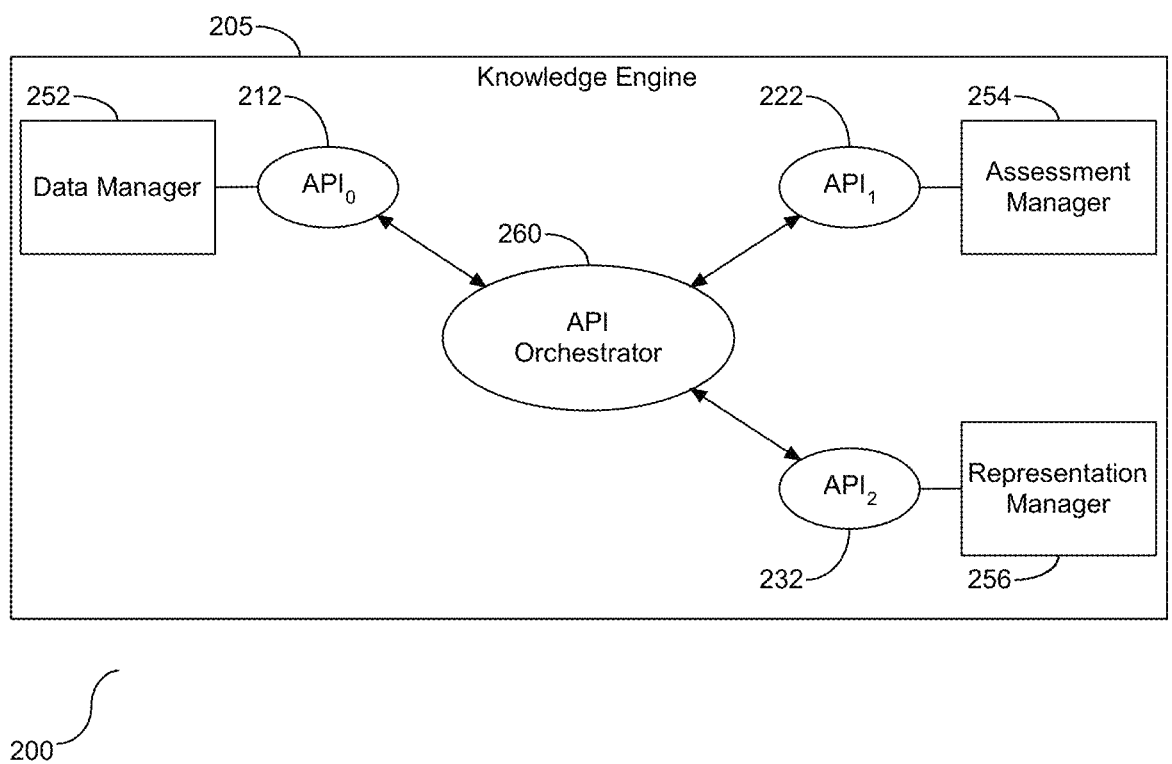
FIG. 2 depicts a block diagram illustrating the similarity assessment tools, as shown and described in FIG. 1, and their associated application program interfaces.

An Application Program Interface (API) is understood in the art as a software intermediary between two or more applications. With respect to the knowledge engine (150) shown and described in FIG. 1, one or more APIs may be utilized to support one or more of the tools (152)-(156) and their associated functionality. Referring to FIG. 2, a block diagram (200) is provided illustrating the tools (152)-(156) and their associated APIs. As shown, a plurality of tools are embedded within the knowledge engine (205), with the tools including the data manager (252) associated with $API_0$ (212), the assessment manager (254) associated with API (222), and the representation manager (256) associated with $API_2$ (232). Each of the APIs may be implemented in one or more languages and interface specifications. $API_0$ (212) provides functional support to process and convert data and/or data streams; API (222) provides functional support to assess the converted data with respect to similarity to other data elements; and $API_2$ (232) provides functional support to create one or more sequences of tuple representations of the process and converted data. As shown, each of the APIs (212), (222), and (232) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
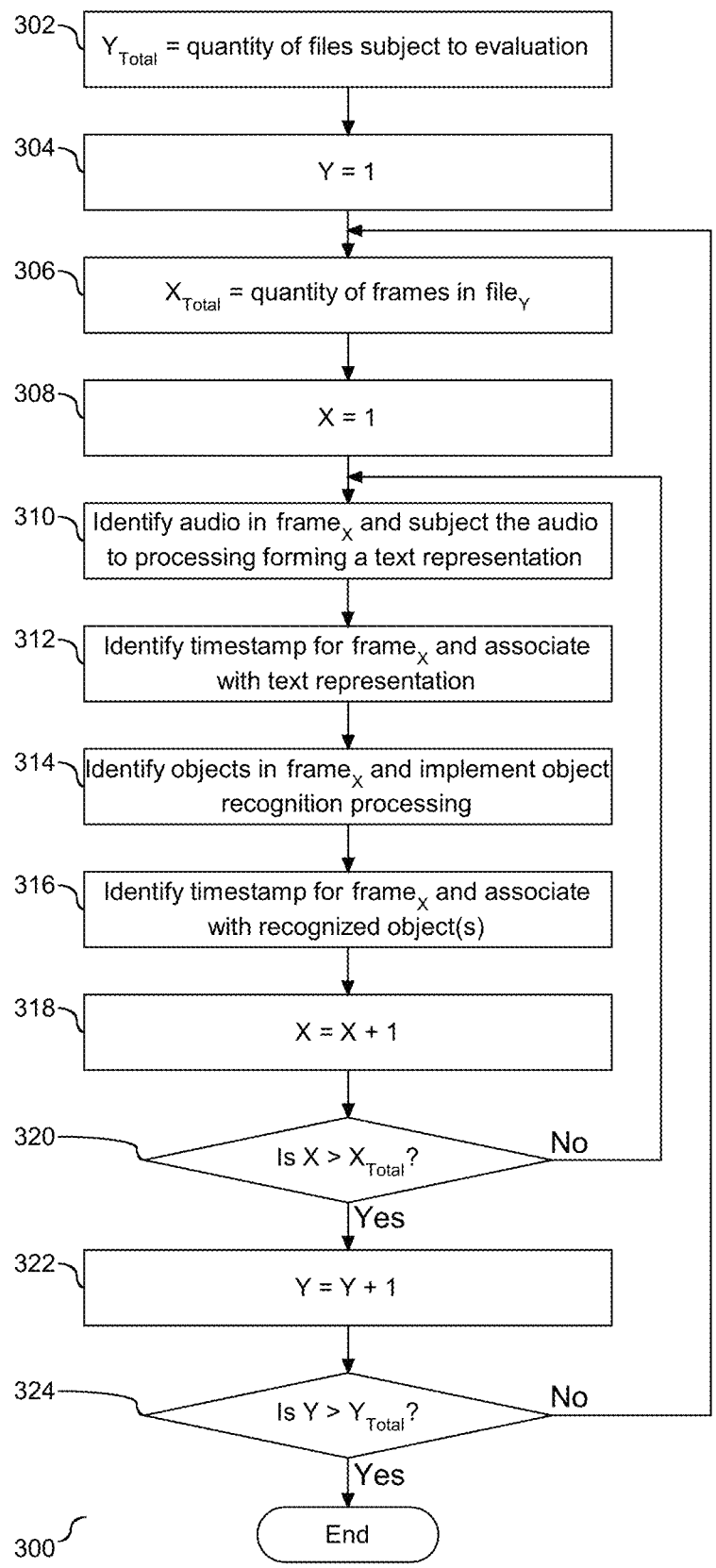
FIG. 3 depicts a flow chart illustrating a process for evaluating multimedia data.

Referring to FIG. 3, a flow chart (300) is provided illustrating a process for evaluating multimedia data. The evaluation may be conducted on one or more sets of multimedia data, hereinafter referred to as multimedia files. The variable $Y_{Total}$ is assigned to the quantity of files subject to the evaluation (302), and a corresponding file counting variable, Y, is initialized (304). It is understood in the art that the multimedia file is comprised of a plurality of frames, and each frame may include speech, objects, or a combination of speech and objects. In one embodiment, each frame represents a unit of measurement, which may be based on size or time. A quantity of frames in file$_Y$ is identified and assigned to the variable $X_{Total}$ (306), and a corresponding frame counting variable is initialized (308). Each individual frame represents a time interval within the file. For example, in one embodiment, the interval may be 10 second, although this is merely an example. In one embodiment, the interval that defines the length of the frame is a configurable value. Audio, also referred to herein as speech, present in frame$_X$ is identified and subject to processing to convert the audio to text (310), e.g. STT, thereby forming a text representation corresponding to the identified speech. In one embodiment, and as described in detail in FIG. 1, the text representation may be further subject to NLP. Accordingly, audio present in the identified frames of the file is detected and subject to processing.

In addition to audio detection and processing, the timestamp of frame$_X$ is identified and associated with the formed text representation (312). The timestamp corresponds to a form of metadata for the captured and processed audio. The file processing is not limited to audio detection. As shown and described herein, any objects present in frame$_X$ are identified and subject to object recognition processing to identify objects in frame$_X$ (314). Similar to step (312), the timestamp of frame$_X$ is identified and associated with the identified object(s) (316). Although the speech and object processing is shown occurring contemporaneous or near-contemporaneous with the frame identification, in one embodiment, the speech and object(s) may be identified and subject to processing after the frame processing is completed. Similarly, in one embodiment, the frame processing may be limited to speech identification or object identification.

Following step (316), the frame counting variable, X, is incremented (318), and it is determined if each of the frames in file$_Y$ have been processed (320). A negative response is followed by a return to step (310), and a positive response concludes the speech and/or object processing for file$_Y$. Following the positive response at step (320), the file counting variable, Y, is incremented (322). It is then determined if each of the identified files have been processed (324). A negative response to the determination at step (324) is followed by a return to step (306), and a positive response concludes processing for each of the identified files. It is understood that as files are identified, they may be individually processed, as shown and described herein by identifying frames in the file, and more specifically identifying and processing speech and/or objects in the identified frames. Accordingly, the order of the steps shown herein for processing the multimedia files should not be considered limiting.

Figure 4:
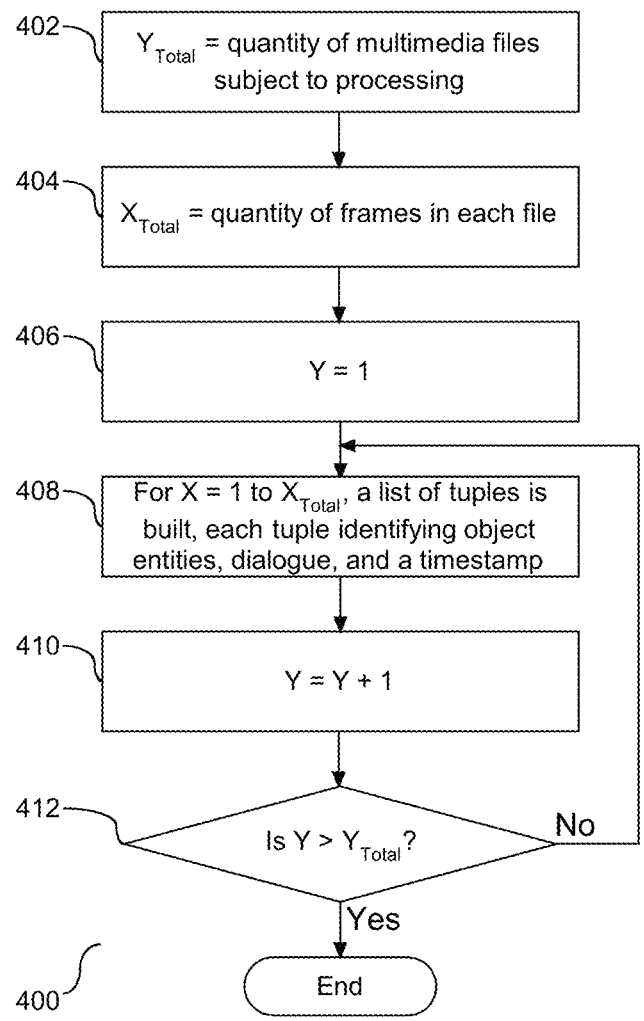
FIG. 4 depicts a flow chart illustrating a process for tuple processing for the multimedia file(s).

The process shown and described in FIG. 3 functions to identify components within the frames that form the multimedia file(s). Referring to FIG. 4, a flow chart (400) is provided to demonstrate tuple processing for the multimedia file(s). The variable $Y_{Total}$ is assigned to the quantity of multimedia files that is the subject of the processing (402), and the variable $X_{Total}$ is assigned to represent the quantity of frames in each of the multimedia files (404). A corresponding file counting variable, Y, is initialized (406). For each $frame_X$ in $file_Y$, a list of tuples is built or otherwise created, with each tuple identifying object entities and dialogue with the time stamp attached to or incorporated with the tuple (408). In one embodiment, the created tuple representation is stored in the knowledge base (160) and associated with the file, $file_Y$. Following step (408), the file counting variable is incremented (410). It is then determined if tuple processing has been completed for each file (412). A negative response to the determination at step (412) is followed by a return to step (408), and a positive response concludes the tuple processing for each of the identified files. In one embodiment, each file is stored in the corresponding knowledge base, and the tuple representation is associated with the respective file, as shown and described in FIG. 1.

Figure 5:
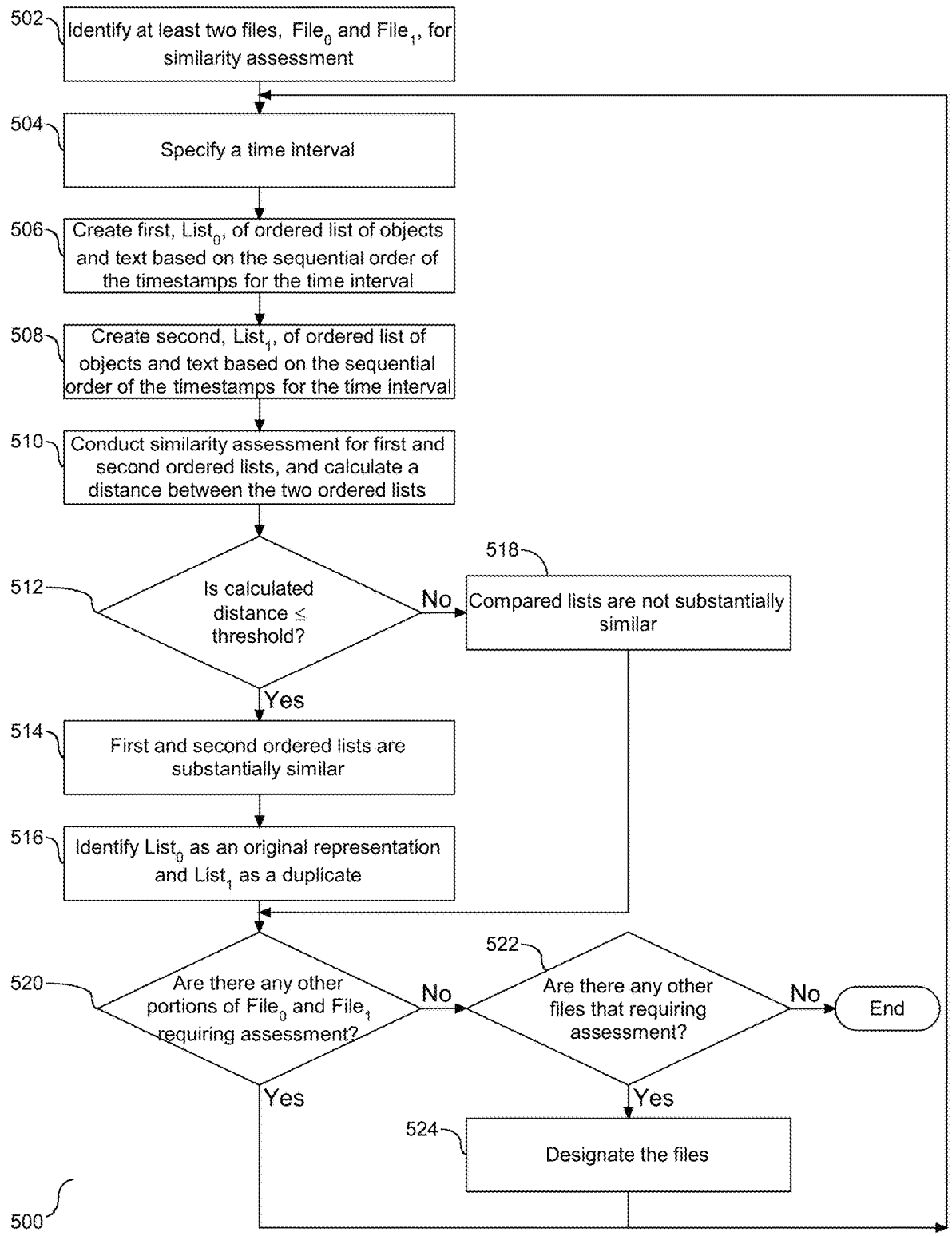
FIG. 5 depicts a flow chart illustrating a process for similarity assessment of two or more multimedia files.

Each of the tuple representations for each file has an attached and identified time stamp. It is understood that files may be identified individually or in groups for similarity processing and assessment. For descriptive purposes, the similarity assessment will be demonstrated by specifying files and subjecting those files to the assessment, although this embodiment should not be considered limiting. Referring to FIG. 5, a flow chart (500) is provided to illustrate a process for similarity assessment of two or more multimedia files. At least two files are identified for the similarity assessment, including a first file, $File_0$, and a second file, $File_1$ (502). The files may be identified in their entirety, or in one embodiment, a select time interval may be identified for the assessment. In the example shown herein, a time interval is specified (504), and a first ordered list of objects and associated text, $List_0$, is created for $File_0$ based on the sequential order of the timestamps for the time interval (506). In addition, second order list of objects and associated text, $List_1$, is created for $File_1$ based on the sequential order of the timestamps for the time interval (508). Accordingly, a sequence of tuple representations is formed for each specified file and time interval.

The first and second ordered lists, e.g. $List_0$ and $List_1$, are subject to a similarity assessment. More specifically, a distance between the two ordered lists is assessed to determine how many edits, e.g. changes, are required to make the ordered lists the same (510). In one embodiment, the assessment at step (510) is a comparison of a first set of tuples against a second set of tuples, with the comparison returning a value reflecting similarity between the tuple sets. In one embodiment, the assessed distance is a numerical value and reflects the quantity of changes necessary to make the compared tuple representations the same, including changes to the represented text and changes to any identified objects. The distance is subject to comparison against a threshold value (512). It is understood that in one embodiment the threshold value is configurable. If the comparison at step (512) indicates that the assessed distance is less than or equal to the threshold value, then it is determined that the compared ordered lists as represented by their sets of tuples are substantially similar (514). Thereafter, the original list, $List_0$, and its corresponding tuple representation is identified and marked as an original version of the represented data, and the compared list, $List_1$, and its corresponding tuple representation is identified and tagged as a duplicate (516). Similarly, if the comparison at step (512) indicates that the assessed distance does not meet the threshold value, then it is determined that the compared lists as represented by the sets of tuples are not substantially similar (518). Following either or steps (516) or (518), it is determined if any further portions of the current files need to be assessed (520). A positive response to the determination at step (520) is followed by a return to step (504) where the portions are defined by their corresponding time interval(s). However, a negative response to the determination at step (520) is followed by determining if any other files or portions thereof need to be assessed (522). A positive response to the determination at step (522) is followed by designating the files to be assessed (524), e.g. designating $File_0$ and File, and returning to step (504) to define the portion of the files that will be subject to assessment. In one embodiment, the assessment may remove one file, e.g. File, and replace it with a new file, e.g. $File_2$, which will be assessed against $File_0$. Similarly, in one embodiment, the designation at step (524) may include new files that have not been previously subject to the assessment. A negative response to the determination at step (522) concludes the file assessment process. Accordingly, files are identified, and either in their entirety or portions thereof, is subject to assessment with respect to duplicate data and substantial similarity of the data across the assessed files.

The duplication assessment shown in FIGS. 3-5, employs one or more tools, as shown and described in FIG. 1. Aspects of the tools (152)-(156) and their associated functionality may be embodied in a computer system/server in a single location, or in one embodiment, may be configured in a cloud based system sharing computing resources. With references to FIG. 6, a block diagram (600) is provided illustrating an example of a computer system/server (602), hereinafter referred to as a host (602) in communication with a cloud based support system, to implement the processes described above with respect to FIGS. 3-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments (610) where tasks are performed by remote processing devices that are linked through a communications network. In a distributed cloud computing environment, program modules may be located in both local and remote computer system storage media including memory storage devices.

Figure 6:
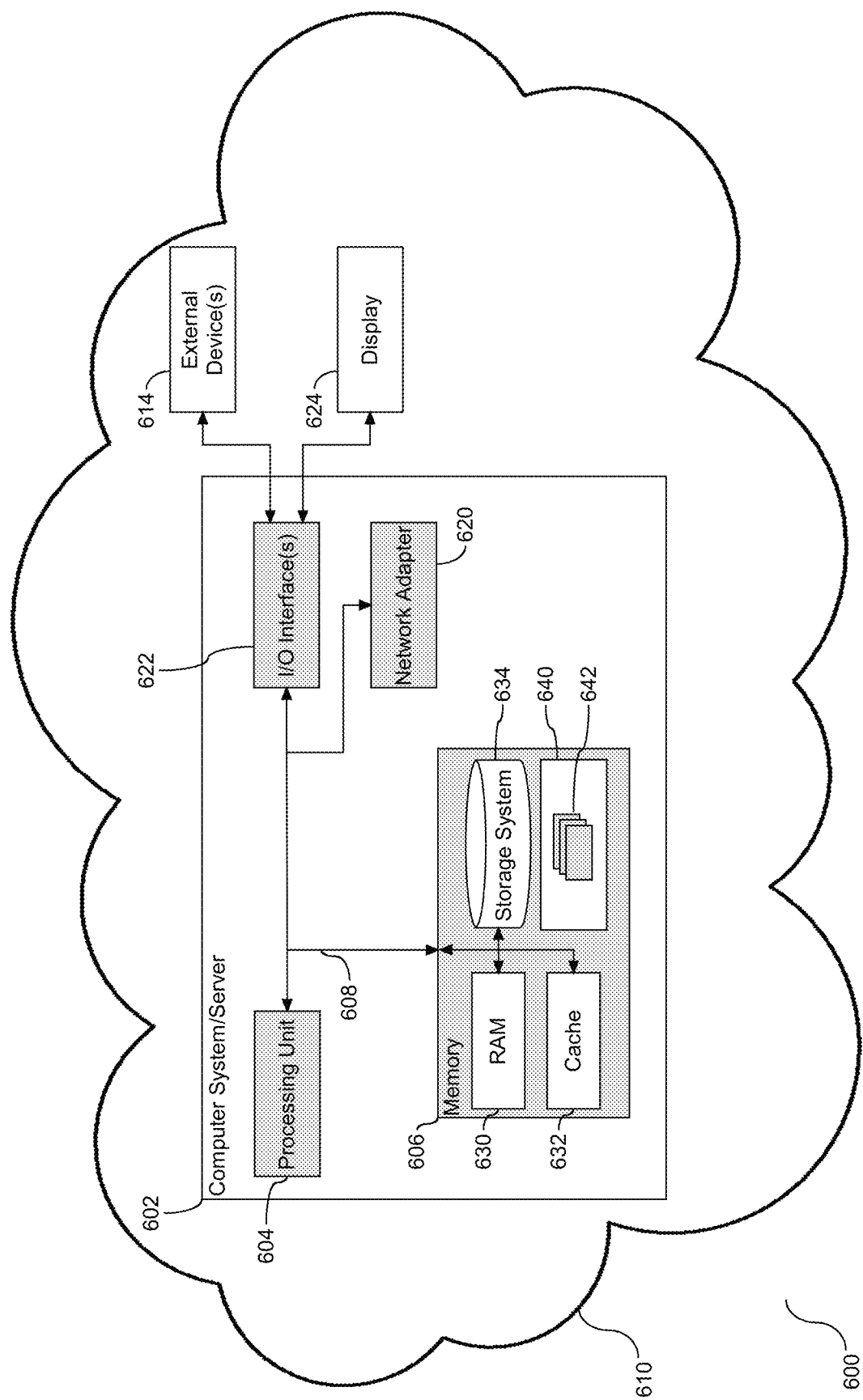
FIG. 6 depicts a block diagram illustrating an example of a computer system/server of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to dynamically communication evaluation interrogatory identification and processing. For example, the set of program modules (642) may include the tools (152)-(156) as described in FIG. 1.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
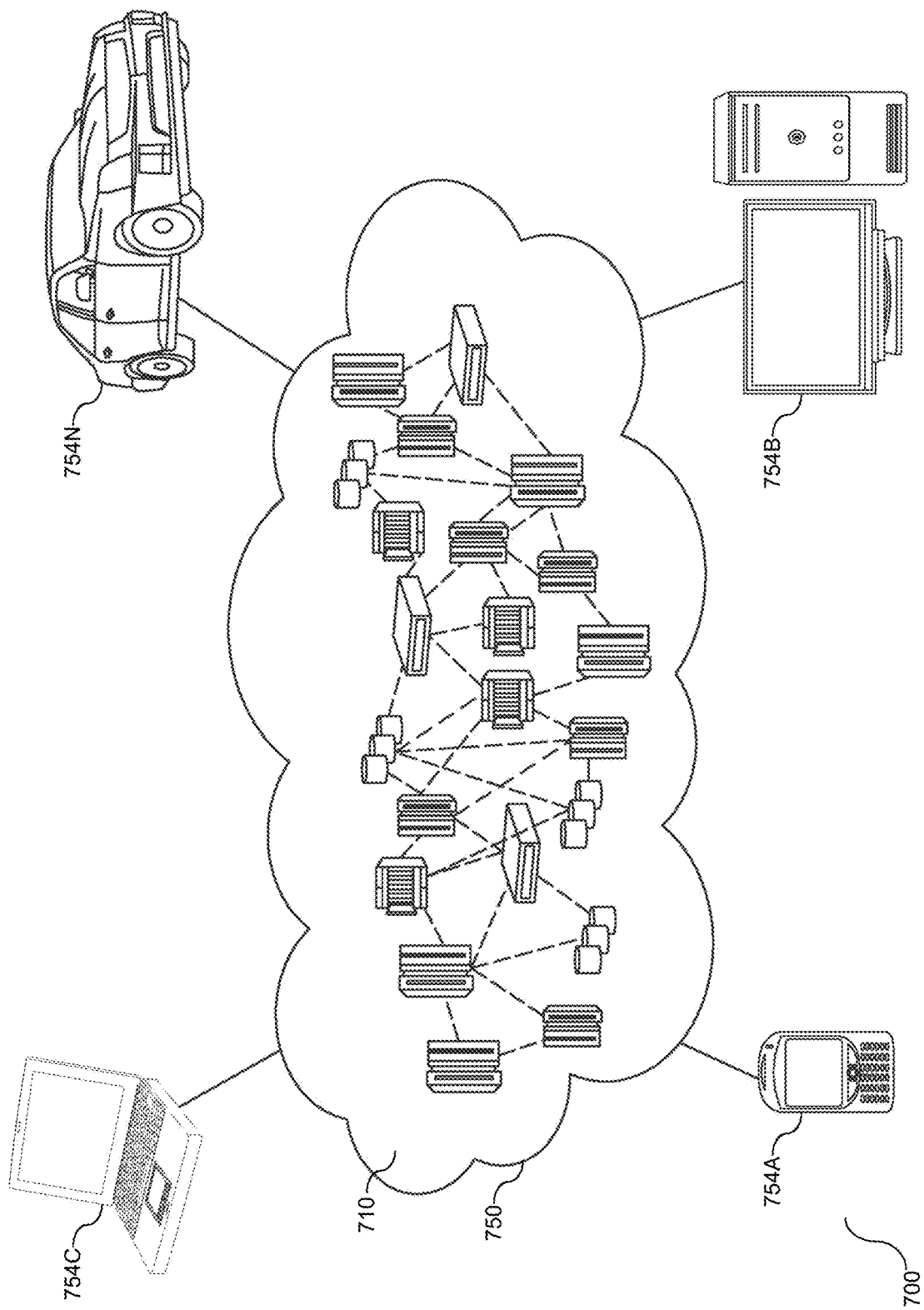
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
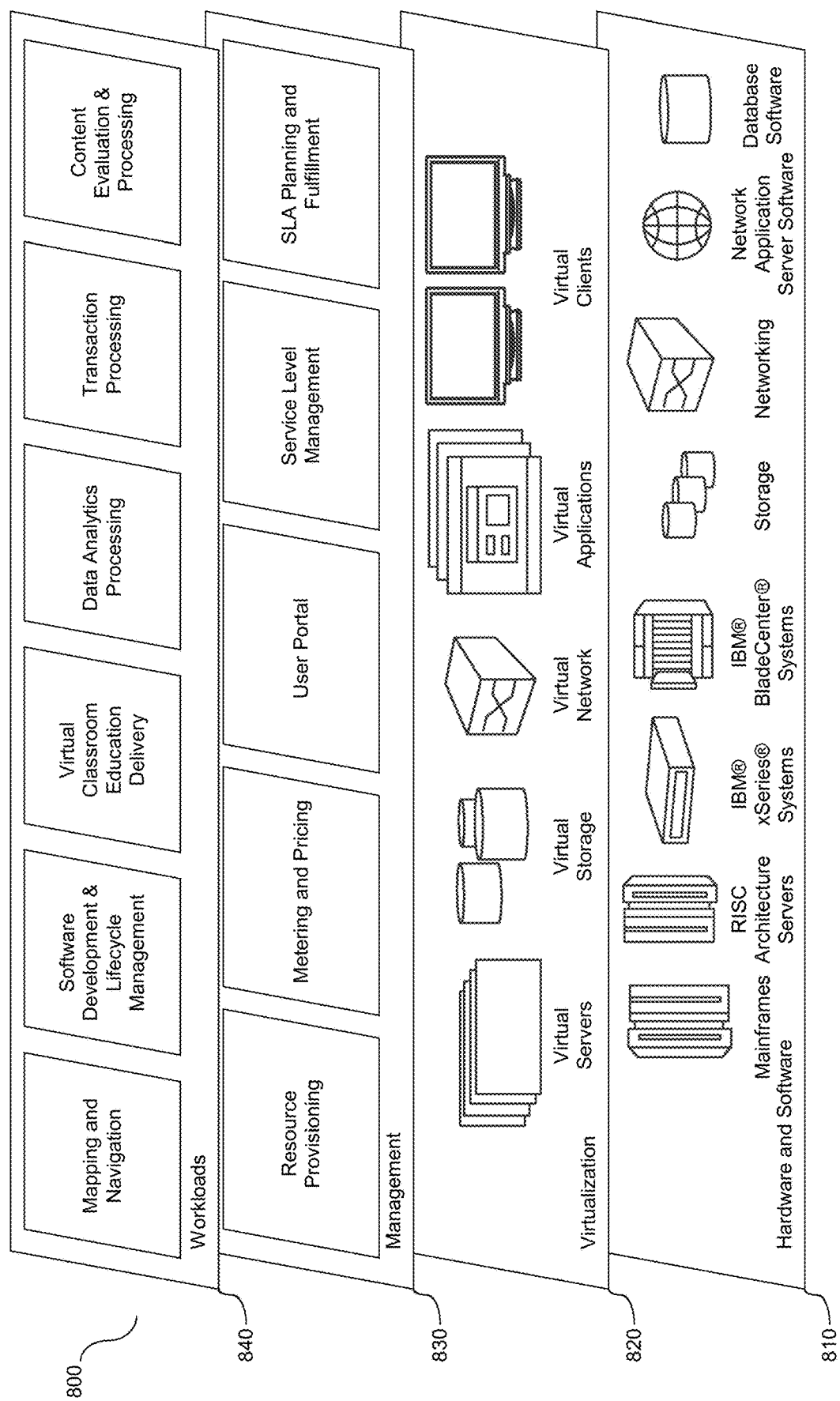
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and content evaluation and processing.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to resolve interrogatories with intent identification and a corresponding response related to the identified intent.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the file and/or data stream processing may be carried out by different computing platforms or across multiple devices. Furthermore, the data storage and/or corpus may be localized, remote, or spread across multiple systems. The tools and processes support dynamic data stream evaluation and processing, including conversion of the data stream into representations and assessment of the representations for similarity. For example, in one embodiment, the dynamic assessment takes place with respect to a current data stream being processed and a previously processed data stream. Accordingly, the scope of protection of the embodiments is limited only by the following claims and their equivalents.

What is claimed is:

1. A computer system comprising:
a processing unit operatively coupled to memory;
a knowledge engine in communication with the processing unit, the knowledge engine to identify duplicate media content, the knowledge engine comprising:
a data stream manager configured to convert a first data stream into a first sequence of events and to convert a second data stream into a second sequence of events, the first sequence of events comprising a first event represented by at least a first tuple, the first tuple comprising one or more first object representations and one or more first dialogue representations, the one or more first object representations representing one or more visual entities of the first event, the one or more first dialogue representations representing one or more dialogue words of the first event, the one or more first object representations and the one or more first dialogue representations being associated with a first timestamp, the second sequence of events comprising a second event represented by at least a second tuple, the second tuple comprising one or more second object representations and one or more second dialogue representations, the one or more second object representations representing one or more visual entities of the second event, the one or more second dialogue representations representing one or more dialogue words of the second event, the one or more second object representations and the one or more second dialogue representations being associated with a second timestamp; and
an assessment manager configured to conduct a similarity assessment between at least the one or more first object representations and the one or more first dialogue representations of the first tuple of the first data stream and the one or more second object representations and the one or more second dialogue representations of the second tuple of the second data stream, respectively, the similarity assessment to produce a distance measurement, the distance measurement representing a quantity of edits necessary to make the one or more first object representations and the one or more first dialogue representations of the first tuple equivalent to the one or more second object representations and the one or more second dialogue representations of the second tuple; and
the processing unit to selectively identify duplicate data in the first and second sequence of events responsive to the distance measurement.

2. The computer system of claim 1, wherein the data stream manager is configured to:
identify one or more first images in the first data stream and process the identified one or more first images into the one or more first object representations; and
identify one or more second images in the second data stream and process the identified one or more second images into the one or more second object representations.

3. The computer system of claim 2, further comprising a representation manager configured to:
form a first sequence of tuple representations for the first data stream and form a second sequence of tuple representations for the second data stream, the first sequence of tuple representations including the first tuple and the second sequence of tuple representations including the second tuple; and
sequentially order the first and second sequences of tuple representations based on timestamp metadata associated with each of the tuple representations.

4. The computer system of claim 1, wherein the data stream manager is configured to:
identify first audio in the first data stream and process the identified first audio into the one or more first dialogue representations, including to convert the identified first audio into first text; and
identify second audio in the second data stream and process the identified second audio into the one or more second dialogue representations, including to convert the identified second audio into second text.

5. The computer system of claim 4, wherein the one or more first object representations comprise a plurality of the first object representations representing a plurality of visual entities of the first event, the one or more first dialogue representations comprise a plurality of the first dialogue representations representing a plurality of dialogue words, or a combination thereof.

6. A computer program product for similarity assessment, the computer program product comprising:
    a computer readable storage medium having program code embodied therewith, the program code executable by a processor to:
        convert a first data stream into a first sequence of events and convert a second data stream into a second sequence of events, the first sequence of events comprising a first event represented by at least a first tuple, the first tuple comprising one or more first object representations and one or more first dialogue representations, the one or more first object representations representing one or more visual entities of the first event, the one or more first dialogue representations representing one or more dialogue words of the first event, the one or more first object representations and the one or more first dialogue representations being associated with a first timestamp, the second sequence of events comprising a second event represented by at least a second tuple, the second tuple comprising one or more second object representations and one or more second dialogue representations, the one or more second object representations representing one or more visual entities of the second event, the one or more second dialogue representations representing one or more dialogue words of the second event, the one or more second object representations and the one or more second dialogue representations being associated with a second timestamp;
        conduct a similarity assessment between at least the one or more first object representations and the one or more first dialogue representations of the first tuple of the first data stream and the one or more second visual object representations and the one or more second object representations and the one or more second dialogue representations of the second tuple of the second data stream, respectively, the similarity assessment to produce a distance measurement representing a quantity of edits necessary to make the one or more first object representations and the one or more first dialogue representations of the first tuple equivalent to the one or more second object representations and the one or more second dialogue representations of the second tuple; and
        selectively identify duplicate data in the first and second sequence of events responsive to the distance measurement.

7. The computer program product of claim 6, further comprising program code executable by the processor to:
    identify one or more first images in the first data stream and process the identified one or more first images into the one or more object representations; and
    identify one or more second images in the second data stream and process the identified one or more second images into the one or more second object representations.

8. The computer program product of claim 7, further comprising program code executable by the processor to:
    form a first sequence of tuple representations for the first data stream and form a second sequence of tuple representations for the second data stream, the first sequence of tuple representations including the first tuple and the second sequence of tuple representations including the second tuple; and
    sequentially order the first and second sequences of tuple representations based on timestamp metadata associated with each tuple representation.

9. The computer program product of claim 6, further comprising program code executable by the processor to:
    identify first audio in the first data stream and process the identified first audio into the one or more first dialogue representations, including to convert the identified first audio into first text; and
    identify second audio in the second data stream and process the identified second audio into the one or more second dialogue representations, including to convert the identified second audio into second text.

10. The computer program product of claim 9, wherein the one or more first object representations comprise a plurality of the first object representations representing a plurality of visual entities of the first event, the one or more first dialogue representations comprise a plurality of the first dialogue representations representing a plurality of dialogue words, or a combination thereof.

11. A method comprising:
    converting a first data stream into a first sequence of events and a second data stream into a second sequence of events, the first sequence of events comprising a first event represented by at least a first tuple, the first tuple comprising one or more first object representations and one or more first dialogue representations, the one or more first object representations representing one or more visual entities of the first event, the one or more first dialogue representations representing one or more dialogue words of the first event, the one or more first object representations and the one or more first dialogue representations being associated with a first timestamp, the second sequence of events comprising a second event represented by at least a second tuple, the second tuple comprising one or more second object representations and one or more second dialogue representations, the one or more second object representations representing one or more visual entities of the second event, the one or more second dialogue representations representing one or more dialogue words of the second event, the one or more second object representations and the one or more second dialogue representations being associated with a second timestamp;
    conducting a similarity assessment between at least the one or more first object representations and the one or more first dialogue representations of the first tuple of the first data stream and the one or more second object representations and the one or more second dialogue representations of the second tuple of the second data stream, respectively, the similarity assessment producing a distance measurement, the distance measurement representing a quantity of edits necessary to make the one or more first object representations and the one or more first dialogue representations of the first tuple equivalent to the one or more second object representations and the one or more second dialogue representations of the second tuple; and selectively identifying duplicate data in the first and second sequence of events responsive to the distance measurement.

12. The method of claim 11, wherein converting the first and second data streams further comprises:
identifying one or more first images in the first data stream and processing the identified one or more first images into the one or more first object representations; and
identifying one or more second images in the second data stream and processing the identified one or more second images into the one or more second object representations.

13. The method of claim 12, further comprising:
forming a first sequence of tuple representations for the first data stream and forming a second sequence of tuple representations for the second data stream, the first sequence of tuple representations including the first tuple and the second sequence of tuple representations including the second tuple; and
sequentially ordering the first and second sequences of tuple representations based on timestamp metadata associated with each tuple representation.

14. The method of claim 11, wherein converting the first and second data streams further comprises:
identifying first audio in the first data stream and processing the identified first audio into the one or more first dialogue representations, including converting the identified first audio into first text; and
identifying second audio in the second data stream and processing the identified second audio into the one or more second dialogue representations, including converting the identified second audio into second text.

15. The method of claim 14, wherein the one or more first object representations comprise a plurality of the first object representations representing a plurality of visual entities of the first event, the one or more first dialogue representations comprise a plurality of the first dialogue representations representing a plurality of dialogue words, or a combination thereof.

* * * * *